(12) United States Patent
Jirsa et al.

(10) Patent No.: US 11,266,123 B2
(45) Date of Patent: Mar. 8, 2022

(54) SYSTEM, METHOD AND APPARATUS FOR MULTI-CONFIGURABLE PET LEASH AND ACCESSORIES

(71) Applicant: WAGNETIC, LLC, New York, NY (US)

(72) Inventors: Jaclyn L. Jirsa, New York, NY (US); Roy Prosise, Cedar Park, TX (US)

(73) Assignee: Wagnetic, LLC, New York, NY (US)

(*) Notice: Subject to any disclaimer, the term of this patent is extended or adjusted under 35 U.S.C. 154(b) by 249 days.

(21) Appl. No.: 16/432,511

(22) Filed: Jun. 5, 2019

(65) Prior Publication Data

US 2019/0373861 A1 Dec. 12, 2019

Related U.S. Application Data

(60) Provisional application No. 62/682,716, filed on Jun. 8, 2018.

(51) Int. Cl.
*A01K 27/00* (2006.01)

(52) U.S. Cl.
CPC .......... *A01K 27/004* (2013.01); *A01K 27/005* (2013.01); *A01K 27/001* (2013.01); *A01K 27/008* (2013.01)

(58) Field of Classification Search
CPC .. A47D 13/086; A01K 27/003; A01K 27/004; A01K 27/005; A01K 27/008; A01K 27/00; A01K 29/00; A45C 2007/0009
See application file for complete search history.

(56) References Cited

U.S. PATENT DOCUMENTS

| | | | |
|---|---|---|---|
| 3,848,270 A | 11/1974 | Rand | |
| 5,865,148 A | 2/1999 | Aguirre et al. | |
| 6,055,942 A | 5/2000 | Romanak et al. | |
| 6,192,835 B1 * | 2/2001 | Calhoun | A01K 27/00 119/792 |
| 6,286,463 B1 | 9/2001 | Sykes | |
| 6,422,177 B1 | 7/2002 | Noguero | |
| 6,450,129 B1 * | 9/2002 | Flynn | A01K 27/00 119/770 |
| 7,421,980 B1 | 9/2008 | Ehlers | |
| 8,142,053 B2 | 3/2012 | Hurwitz | |
| 8,347,824 B2 | 1/2013 | Marshall | |
| 8,353,603 B2 * | 1/2013 | Berry | A01K 27/008 362/154 |
| 9,386,841 B2 * | 7/2016 | Labadini | A45F 4/02 |
| 9,872,555 B2 | 1/2018 | Calman et al. | |
| 9,930,868 B2 * | 4/2018 | Cox | A01K 27/003 |

(Continued)

FOREIGN PATENT DOCUMENTS

WO WO-2020255175 A1 * 12/2020 ........... A01K 27/008

*Primary Examiner* — Kristen C Hayes
(74) *Attorney, Agent, or Firm* — Dickinson Wright, PLLC; Michael E. Noe, Jr.

(57) ABSTRACT

A multi-configurable pet product and accessories are disclosed. The pet product can include a leash with a handle, clasp and leash connectors. A storage unit can be removably attached to the leash via storage unit connectors. The storage unit can have zippered pouches that are collapsible and expandable for storage of other items. In addition, the pet product can include a user mount that is wearable by the user via user mount connectors. Accordingly, the pet product can include multiple configurations for usage with a pet or without a pet.

16 Claims, 7 Drawing Sheets

(56) References Cited

U.S. PATENT DOCUMENTS

| | | | |
|---|---|---|---|
| 9,939,545 B2 | 4/2018 | Herrera et al. | |
| 10,021,943 B2 | 7/2018 | Ferris | |
| 10,278,366 B2* | 5/2019 | Evans | A01K 27/003 |
| 10,750,722 B2* | 8/2020 | Wilson | A45C 15/00 |
| 2006/0266301 A1* | 11/2006 | Perkitny | A01K 27/003 |
| | | | 119/770 |
| 2009/0205585 A1* | 8/2009 | La Herran | A01K 27/006 |
| | | | 119/795 |
| 2009/0289090 A1 | 11/2009 | Fullerton et al. | |
| 2010/0024741 A1* | 2/2010 | Schoppman | A01K 27/006 |
| | | | 119/795 |
| 2016/0235039 A1 | 8/2016 | Beal | |
| 2016/0317855 A1 | 11/2016 | Rolls | |
| 2017/0094945 A1* | 4/2017 | Sullivan | A01K 27/008 |
| 2017/0142934 A1* | 5/2017 | Evans | H02J 50/40 |
| 2017/0360009 A1* | 12/2017 | Anderson | A45F 3/02 |
| 2018/0249682 A1 | 9/2018 | Brian | |
| 2020/0100470 A1* | 4/2020 | Cibotti | A01K 27/005 |
| 2020/0329676 A1* | 10/2020 | Sanchies | A01K 27/002 |
| 2021/0289753 A1* | 9/2021 | Bradford | A01K 27/008 |

\* cited by examiner

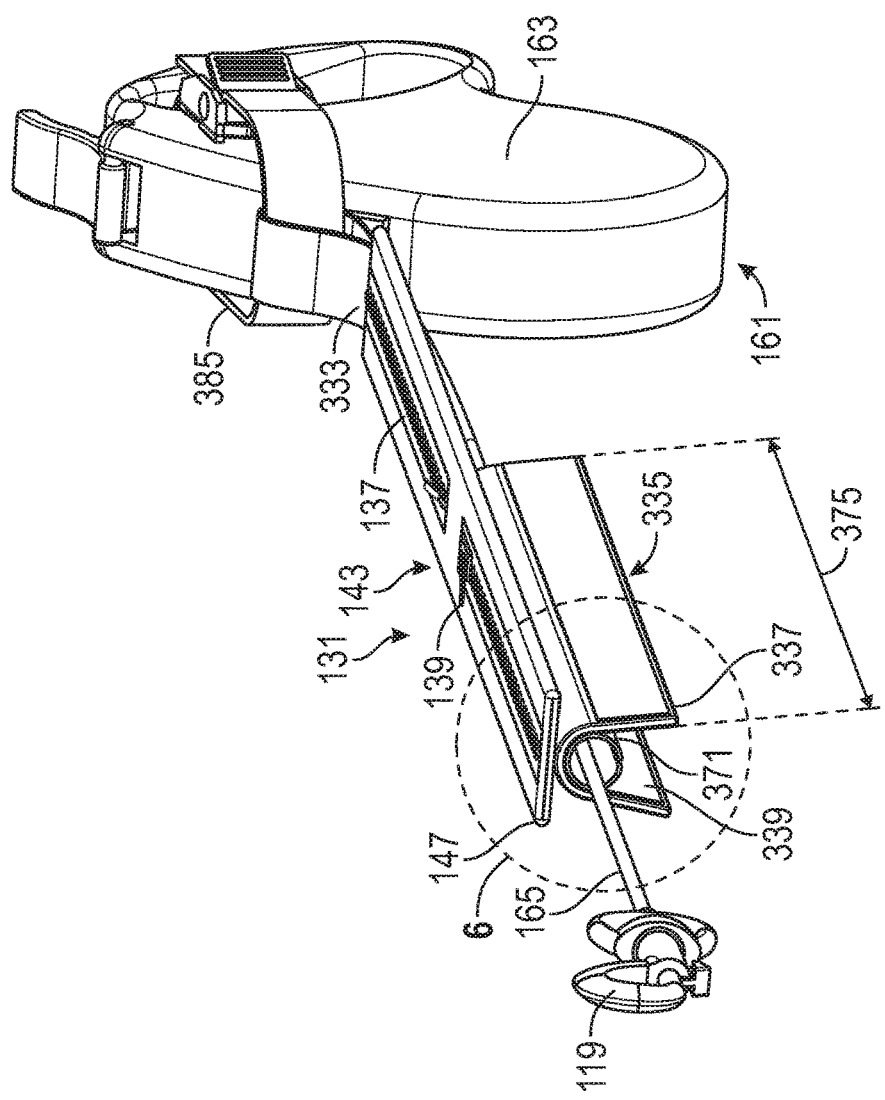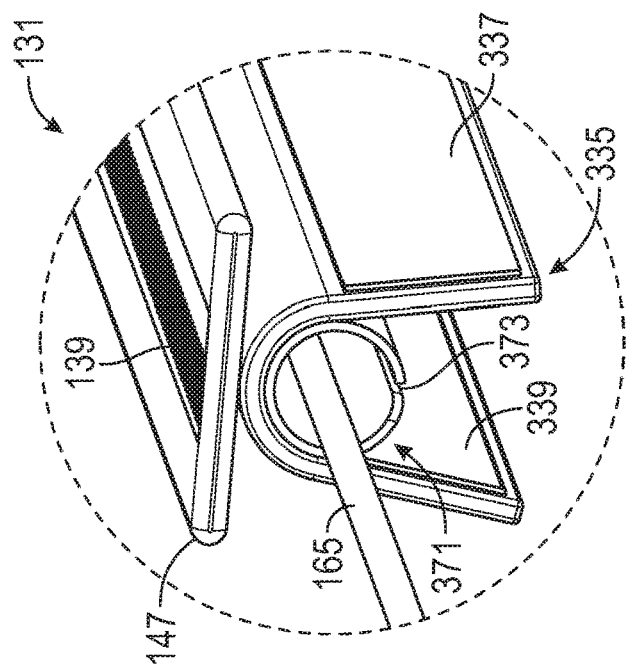

SYSTEM, METHOD AND APPARATUS FOR MULTI-CONFIGURABLE PET LEASH AND ACCESSORIES

This application claims priority to and the benefit of U.S. Prov. Pat. App. 62/682,716, filed Jun. 8, 2018, which is incorporated herein by reference in its entirety.

BACKGROUND OF THE INVENTION

Field of the Disclosure

The present invention relates in general to pet-related products and, in particular, to a system, method and apparatus for a multi-configurable pet leash and optional accessories.

Description of the Prior Art

Many pet owners walk or run with their pets, and carry one or more of various accessories and/or pet accessories with them, such as waste disposal bags, keys, phone or other personal electronic device, headphones, identification, money, pet treats, collapsible dog bowl, waste bag and/or waste disposal dispenser, dog toy(s) and hand sanitizer. It would be desirable to have a pet accessory system that allows a user to customize the apparatus based on the particular activity and accessories that the pet owner desires on a particular excursion. In addition, pet owners would enjoy the adaptability of pet products to permit them to take more or fewer accessories, or to change the purpose of their activity. Thus, improvements in pet products continue to be of interest.

SUMMARY

Embodiments of a system, method and apparatus for a multi-configurable pet product and accessories are disclosed. For example, the pet product can include a leash with a handle, clasp and leash connectors. A storage unit can be removably attached to the leash via storage unit connectors. The storage unit can have zippered pouches that are collapsible and expandable for storage of other items. In addition, the pet product can include a user mount that is wearable by the user via user mount connectors. Accordingly, the pet product can include multiple configurations for usage with a pet or without a pet.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIG. 5 is an isometric view of an embodiment of a pet product in still another configuration.

FIG. 6 is an enlarged, isometric view of a portion of the pet product of FIG. 5.

The use of the same reference symbols in different drawings indicates similar or identical items.

DETAILED DESCRIPTION

Figure 1:
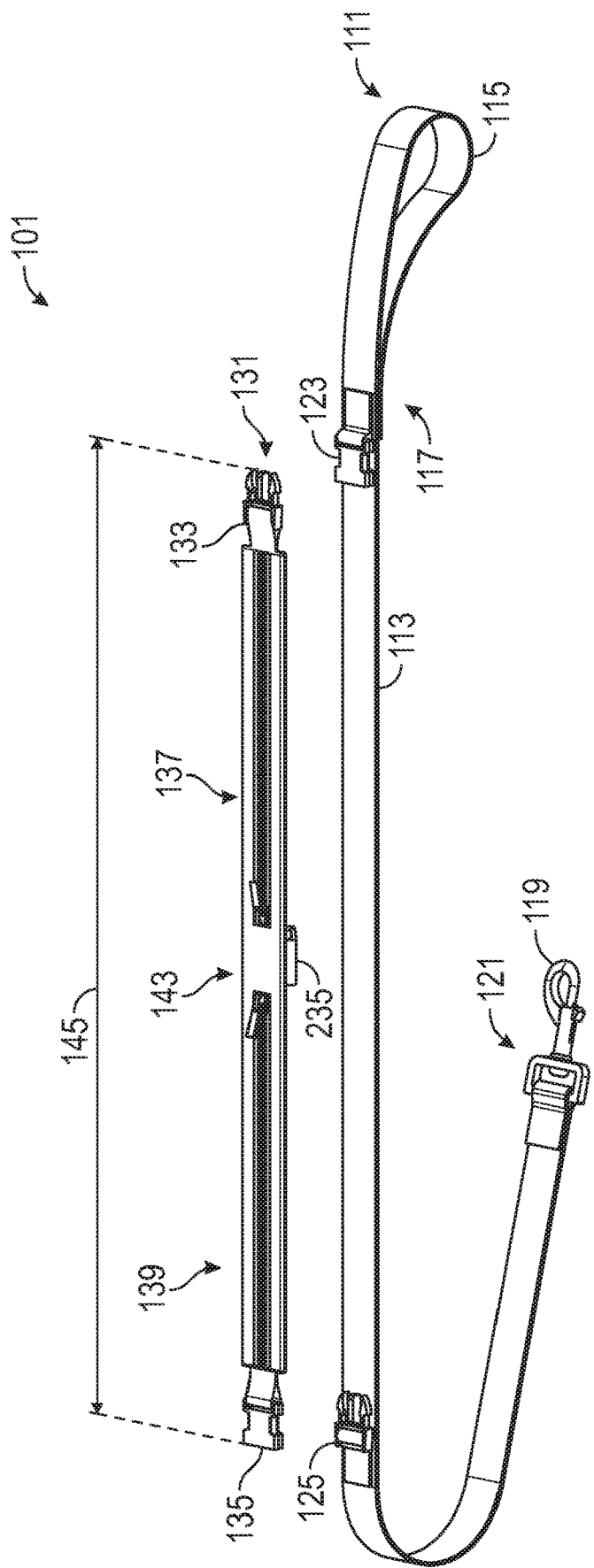
FIG. 1 is a partially exploded, isometric view of an embodiment of a pet product.
Figure 2:
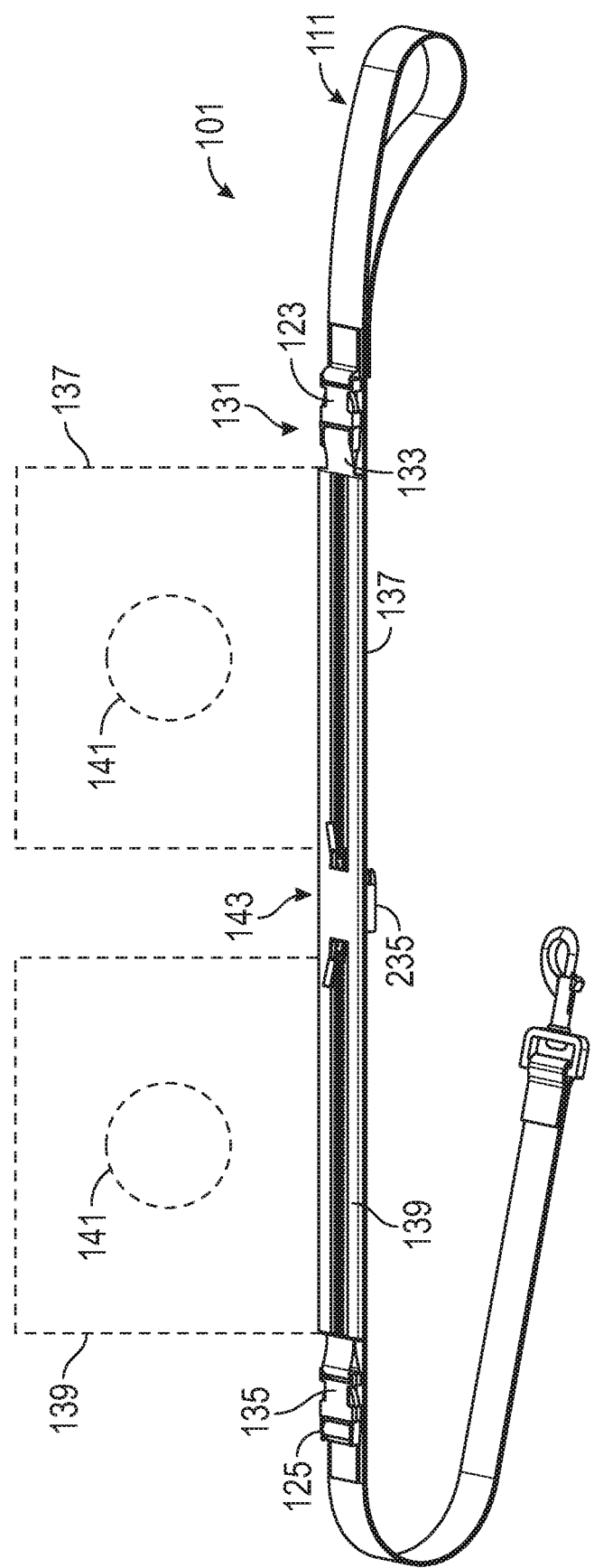
FIG. 2 is an isometric view of an embodiment of a pet product in one configuration.

Embodiments of a system, method and apparatus for a multi-configurable pet product and accessories are disclosed in FIGS. 1-9. For example, a pet system or pet product 101 can include a leash 111 comprising a strap 113. A handle 115 can be located on a proximal end 117 of the leash 111 and configured to be grasped by a user. In addition, a clasp 119 can be located on a distal end 121 of the leash 111 and configured to be releasably coupled to a pet restraint (e.g., a collar, harness, etc.). Further, leash connectors 123, 125 can be mounted to the leash 111 between handle 115 and the clasp 119. As shown in FIG. 2 with the leash 111 in an extended configuration, the leash connectors 123, 125 on the leash 11 can extend toward each other, rather than toward handle 115 and clasp 119, respectively.

Versions of the pet product 101 also can include a storage unit 131. Examples of the storage unit 131 can include storage unit connectors 133, 135. The storage unit connectors 133, 135 can be mounted on opposite ends of the storage unit 131. With the storage unit 131 in an extended configuration (FIG. 2), the storage unit connectors 133, 135 can extend in opposite directions from each other. Comparing FIGS. 1 and 2, the storage unit connectors 133, 135 can be configured to be releasably coupled to respective ones of the leash connectors 123, 125. In one example, each of the leash connectors 123, 125, and storage unit connectors 133, 135 can comprise a male or female buckle connector.

Embodiments of the storage unit 131 can include one or more pouches 137, 139 (e.g., two shown). Each pouch 137, 139 can include an independent closure mechanism, such as a zipper 140. For ease of illustration, the zippers 140 are shown in closed configurations. The zippers 140, however, can be independently operable (e.g., unzipped) as is known in the art. Each pouch 137, 139 can include a collapsed configuration (e.g., FIGS. 1-8) wherein the pouches are retracted (e.g., folded) within the storage unit 131 and zipped close. Each pouch 137, 139 also can include a deployed configuration, as suggested by the schematic, dashed line versions of the pouches 137, 139 in FIG. 2, and the full deployment configuration shown in FIG. 9. The pouches 137, 139 can be unzipped open and expanded in volume, such as for storage of one or more other objects 141. The other objects 141 can include any of the accessories or components described herein or still other items. Moreover, even though the pouches 137, 139 are illustrated to be similar or even identical, they are not limited in this way. For example, the pouches 137, 139 can be symmetrical, asymmetrical, or different sizes or volumes, or differ by still other properties or parameters. Furthermore, the pouches 137, 139 can be centered as shown, or offset or positioned in any manner with respect to the different components of the pet product 101.

Figures 3, 4:
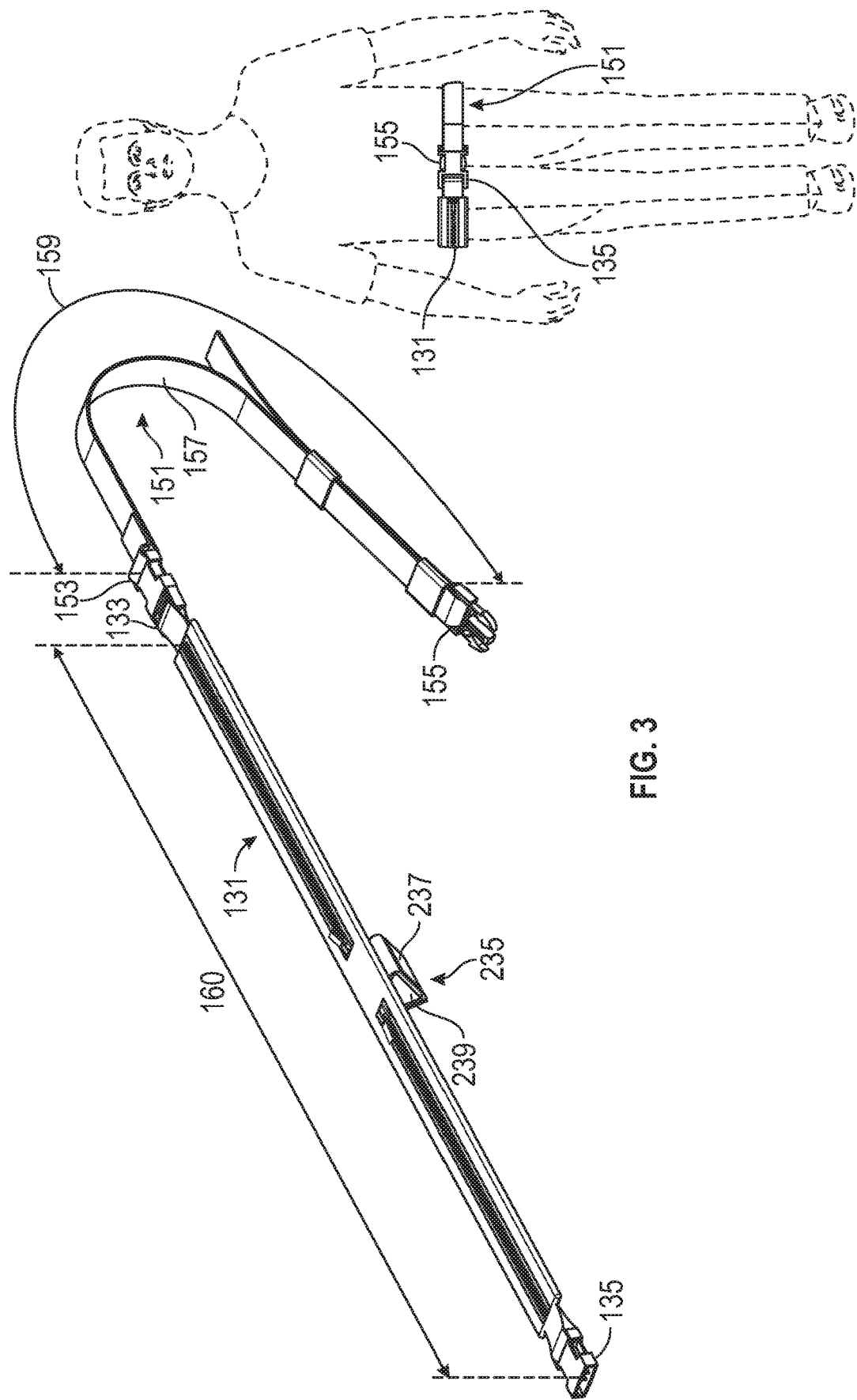
FIG. 3 is an isometric view of an embodiment of a pet product in another configuration.
FIG. 4 is a schematic view of the embodiment of FIG. 3 being worn by a user.

FIGS. 3 and 4 depict examples of the pet product 101 that include a user mount 151. Embodiments of the user mount 151 can include a belt, such as a strap 157. The user mount 151 can include user mount connectors 153, 155 that can be configured to be releasably coupled to the leash connectors 133, 135. In addition, the user mount 151 can have an adjustable length 159 between the user mount connectors 153, 155. In one example, the user mount connectors 153, 135 can comprise a male or female buckle connector.

Figure 9:
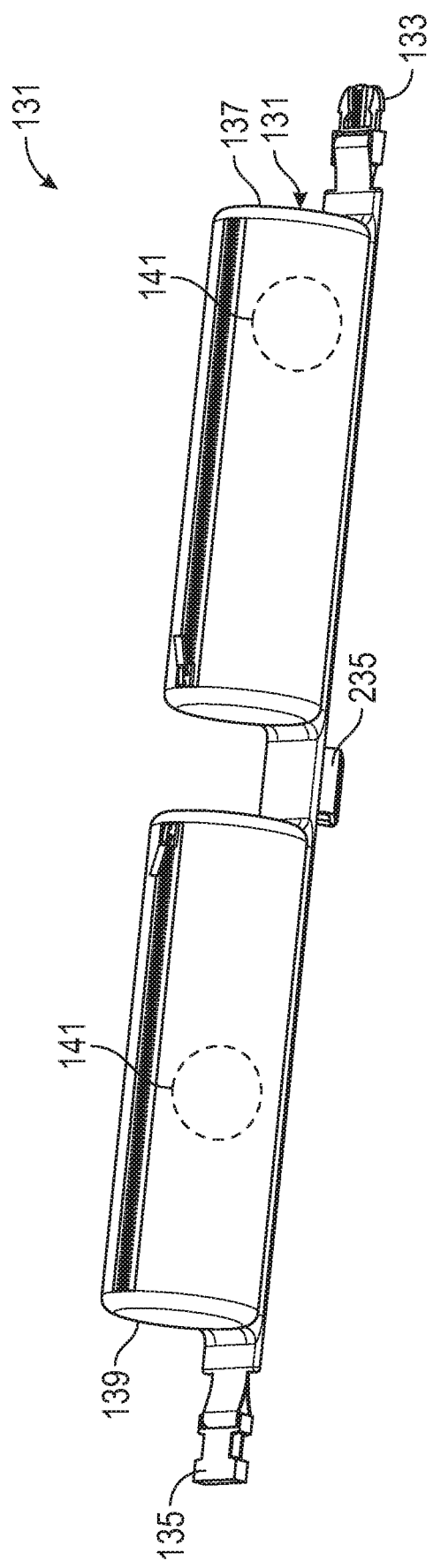
FIG. 9 is an isometric view of a portion of an embodiment of a pet product in a deployed configuration.

Embodiments of the pet system or pet product 101 can include multiple configurations and a flexible adaptability that is superior to conventional pet systems and products. For example, the pet product 101 can include a "fixed leash" or "first" configuration, as depicted in FIGS. 1 and 2. In the first configuration, the leash 111 can be coupled to only the storage unit 133 via the leash connectors 123, 125 and the storage unit connectors 133, 135, respectively. In the first configuration, the user mount connectors 153, 155 are not coupled to the leash connectors 123, 125 or to the user mount connectors 153, 155. The first configuration is configured and suitable for walking a pet with the leash 111. Optionally, the other components, accessories and items not included in the first configuration can be stored in one or more of the pouches 137, 139, as illustrated in FIGS. 2 and 9.

Some embodiments of the pet system or pet product 101 also can include a retractable leash or "second" configuration, as suggested in FIGS. 5 and 6. For example, in the second configuration, the storage unit 131 can be configured to be releasably attached only to a retractable leash 161. The retractable leash 161 can include a body 163 with a retractable cord 165 extending therefrom, as is known in the art. In this version, the storage unit 131 can include storage unit connectors 333, 335 that are not coupled to the leash connectors 133, 135, or to the user mount connectors 153, 155. The second configuration is configured and suitable for walking a pet with the retractable leash 161. As noted above, the other components, accessories and items not included in the second configuration can be stored in one or more of the pouches 137, 139, as suggested in FIGS. 2 and 9.

Further embodiments of the pet system or pet product 101a user wearable or "third" configuration, as shown in FIGS. 3 and 4. For example, in the third configuration, the storage unit 131 can be coupled to only the user mount 151 via the storage unit connectors 133, 135 and user mount connectors 153, 155, respectively. In this version, the storage unit connectors 133, 135 are not coupled to the leash connectors 123, 125 or to the retractable leash 161. In the third configuration, the system is configured to be worn by the user and not directly coupled to the pet. In one example, an overall length 160 (FIG. 3) of the storage unit 131 and user mount 151 is configured to be adjustable to fit a waist of the user. Again, the other components, accessories and items not included in the third configuration can be stored in one or more of the pouches 137, 139. Alternatively, the leash can be place in one of the pouches of the storage unit, and the storage unit can be attached to the user.

In an alternate embodiment of the pet product 101, the storage unit 131 can include a storage-leash connector 235 (FIGS. 1-3). The storage-leash connector 235 can be located on an opposite side of the storage unit 131, relative to the pouches 137, 139. In addition, the storage-leash connector 235 can be located adjacent a middle 143 of a length 145 of the storage unit 131. Versions of the storage-leash connector 235 can be configured to have an attached configuration (FIG. 2) for securing the middle 143 of the length of the storage unit 131 to the leash 111, and a released configuration (FIGS. 1 and 3) detached from the leash 111. Alternatively, the storage-leash connector 235 may be located on the leash 111, such that it can be releasably attached to the storage unit 131.

In some examples, the storage-leash connector 235 can include mating portions 237, 239 (FIG. 3) of a hook-and-loop fastener that can extend around the leash 111 (FIG. 2) and secure the middle 143 of the storage unit 131 to the leash 111 in the attached configuration.

FIGS. 5 and 6 depict other embodiments of the storage-leash connector 335, which is shown "open" or unfastened, but is closeable. The storage-leash connector 335 can extend along the length of the pet product 101 from about adjacent to the middle 143 of the length 145 (e.g., FIG. 1) of the storage unit 131, to a distal end 147 (FIGS. 5 and 6) of the storage unit 131. Examples of the storage-leash connector 335 can include mating portions 337, 339 (e.g., hook-and-loop fastener).

In addition, a conduit 371 (e.g., a plastic tube) can be located in the storage-leash connector 335. The conduit 371 can be temporarily or permanently mounted inside the storage-leash connector 335. Embodiments of the conduit 371 can comprise a rigid polymer sleeve having a slit 373 (see FIG. 6) that extends along a length 375 of the conduit 371. The slit 373 can enable the retractable cord 165 to be installed into and uninstalled from the conduit 371 for extension and retraction therethrough during use of the pet product 101 with a pet.

Figure 7:
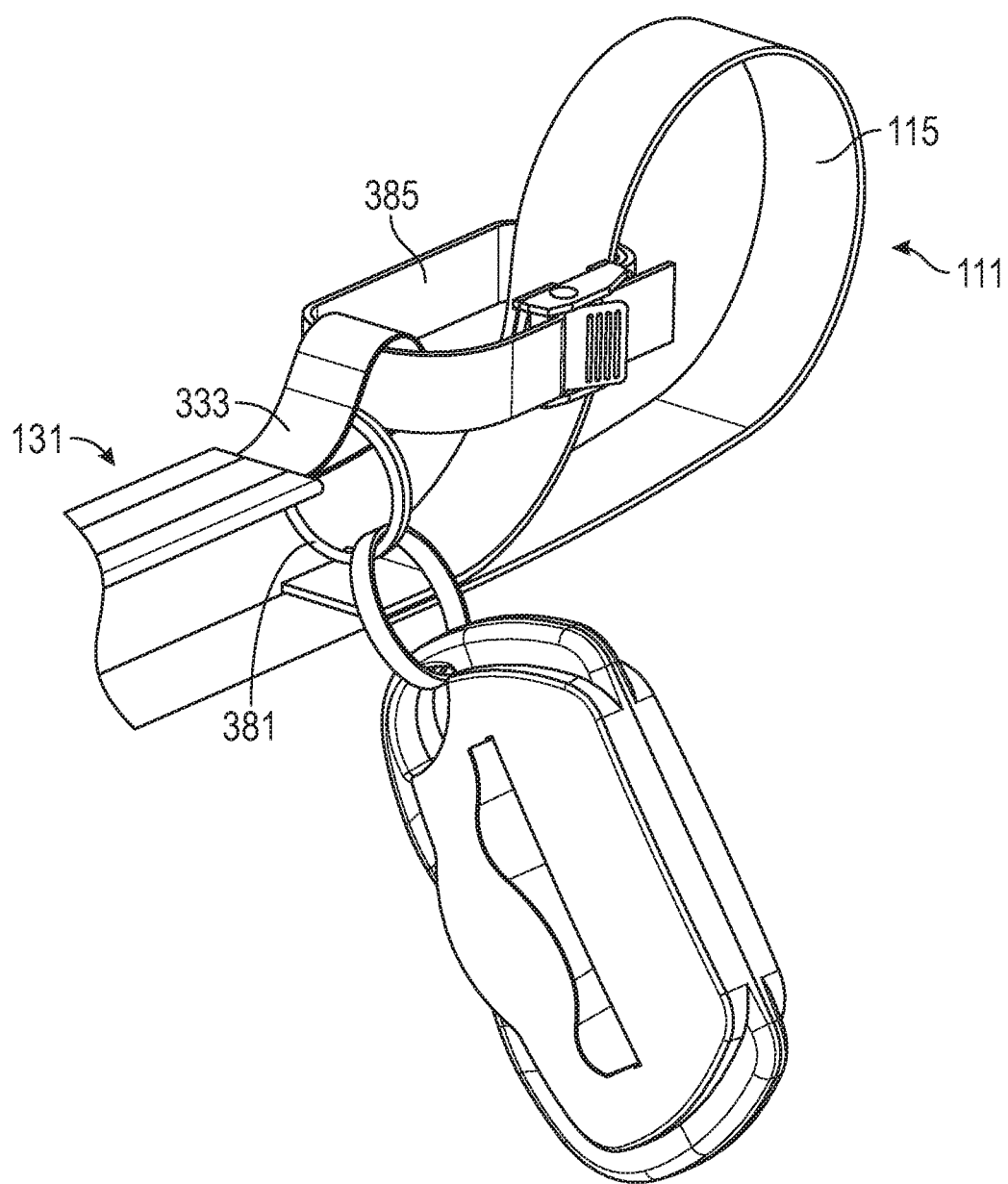
FIG. 7 is an isometric view of an alternate embodiment of a pet product in yet another configuration.
Figure 8:
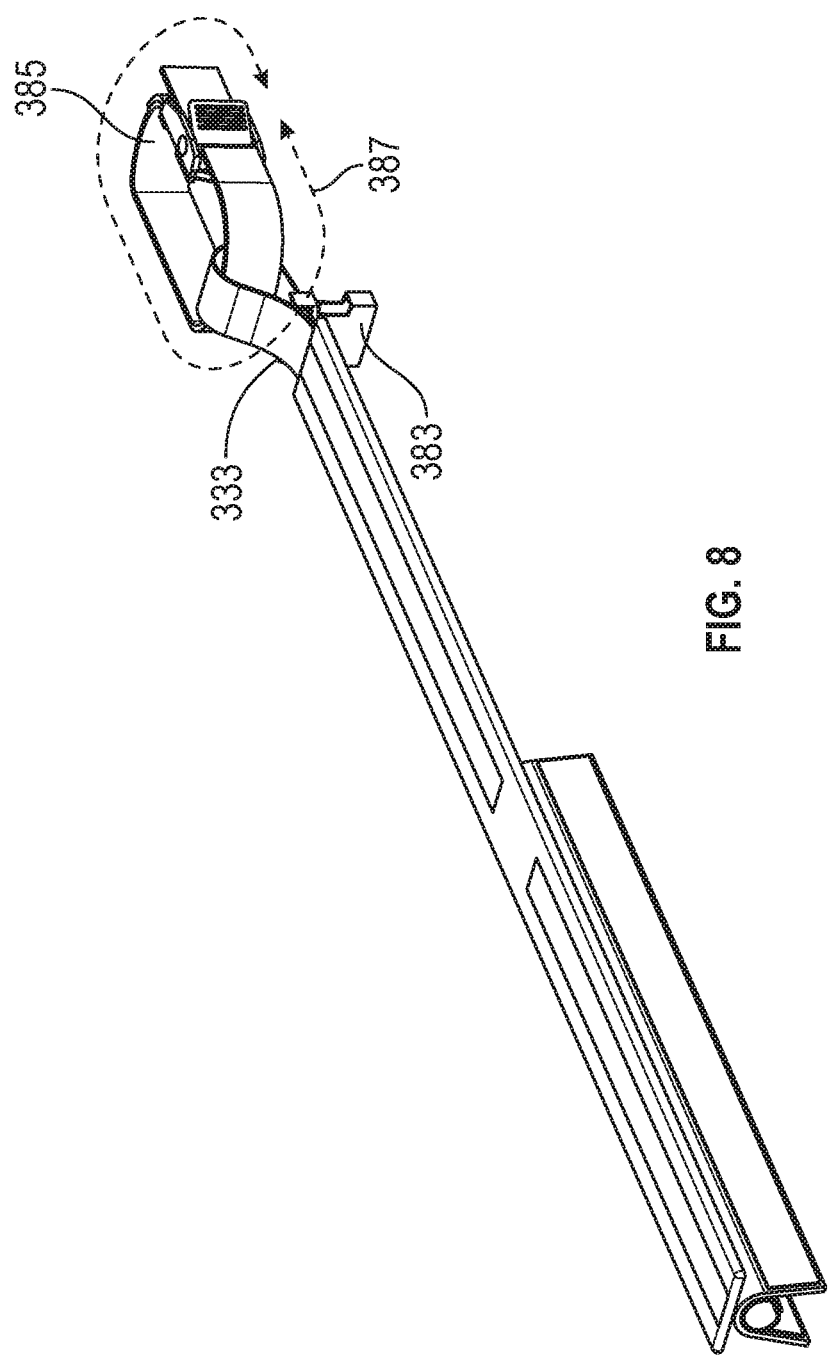
FIG. 8 is an isometric view of an alternate configuration of the pet product of FIG. 7.

In alternate embodiments of the pet product 101 (FIGS. 5, 7 and 8), a proximal one of the storage-unit connectors 333 can include a loop, as shown. A distal one of the storage-unit connectors 335 can include one of types of storage-leash connectors 235, 335 shown in FIGS. 1-3, and FIGS. 5, 6 and 8, respectively. As shown in FIGS. 7 and 8, an example of the pet product 101 can include a proximal one of the leash connectors 335 comprising one or more of a ring 381, buckle connector 383, or a strap 385 having an adjustable length 387.

Embodiments of a system, method and apparatus for pet-related products can include a leash system and accessories. The accessories can be configured to be attached to the leash. Versions of the leash can include a fabric material. The fabric material can include one or more materials, such as woven polymer material, flat nylon, tubular nylon, flat leather, braided leather, cotton, chain, rope, polypropylene webbing or polyester webbing. A handle can be located on one end of the leash for manual engagement by a user. A releasable clasp can be located opposite the handle and can be attached to a collar or a harness of a pet, as is known in the art.

Examples of the types of items that the accessory can be include one or more pet toys, such as a ball (e.g., nubble ball), bone-shaped pet toy, pouch, waste bag dispenser, water holder, food container, grooming device, hook attachment for storage, a light or a holder configured to hold or retain a separate device. For example, the separate device can be one or more of a telephone, smartphone, key, disposable bags, liquid container, food container, grooming device, grooming wipes, wallet, identification or pet tags. Versions of the pouch may include a pouch cover sewn to the leash. The pouch cover can have a thickness that is less than that of the leash. In one example, the system does not have magnets or magnetic attachment systems.

Having secure attachments, as described herein, on both the leash and the accessories enables the accessories to be retained on the leash under almost any circumstances. Thus, despite the significant weight of the accessories, they can be retained by the leash even when the leash is secured to larger pets under walking, running and playing conditions. The accessories are designed to be removed from the leash only when desired. This can be done by applying direct force to the leash and/or the chosen accessory to intentionally separate them from each other.

One feature this enables for the subject invention is for pets that may pull or tug on the leash when walking. The location of one or more accessories near the collar at the bottom of the leash allows the pet to hold the accessory in its mouth (rather than the leash) while walking, even though the accessory is still attached to the leash. Such a feature can enhance and make the pet walking experience more enjoyable. The availability to the pet of one or more accessories at any time of its choosing positively distracts and refocuses the pet from biting the leash. If the pet decides it no longer wants to carry the accessory in its mouth, the pet releases the accessory (which is still attached to the leash) and the owner does not have to pick it up and carry it.

Regarding terminology, a leash also may be referred to as a lead, a lead line or a tether. A leash may comprise a strap, a rope, etc., that may be attached to the neck or head of an animal, such as a pet, for restraint or control. On the animal, some leashes clip or tie to a collar, harness or halter that is directly secured to the animal, while other types of leashes may be placed directly on the animal.

Other versions may include one or more of the following embodiments.

1. A pet product, comprising:
a leash comprising a strap, a handle on a proximal end of the leash configured to be grasped by a user, a clasp on a distal end of the leash configured to be releasably coupled to a pet restraint, leash connectors mounted to the leash between handle and the clasp, and the leash connectors extend toward each other; and
a storage unit comprising storage unit connectors mounted on opposite ends thereof, the storage unit connectors extend in opposite directions from each other, the storage unit connectors are configured to be releasably coupled to respective ones of the leash connectors and the storage unit comprises a plurality of zippered pouches that are independently operable of each other, each zippered pouch has a collapsed configuration wherein the zippered pouch is retracted within the storage unit and zipped close, and a deployed configuration wherein the zippered pouch is unzipped open and expanded in volume for storage of another object.

2. The pet product of any of these embodiments, further comprising a user mount comprising a strap having an adjustable length and user mount connectors configured to be releasably coupled to the leash connectors.

3. The pet product of any of these embodiments, further comprising a fixed leash configuration wherein the leash is coupled to only the storage unit via the leash connectors and the storage unit connectors, respectively, the user mount connectors are not coupled to the leash connectors or the user mount connectors, such that the fixed leash configuration is configured for walking the pet with the leash.

4. The pet product of any of these embodiments, further comprising a retractable configuration wherein the storage unit is configured to be attached only to a retractable leash having a body with a retractable cord extending therefrom, and the storage unit connectors are not coupled to the leash connectors or the user mount connectors, such that the retractable configuration is configured for walking the pet with the retractable leash.

5. The pet product of any of these embodiments, further comprising a user configuration wherein the storage unit is coupled to only the user mount via the storage unit connectors and user mount connectors, and the storage unit connectors are not coupled to the leash connectors or the retractable leash, such that the user configuration is configured to be worn by the user and not directly coupled to the pet.

6. The pet product of any of these embodiments, wherein one of the leash and storage unit comprises a storage-leash connector configured to be releasably coupled to the other of the leash and storage unit.

7. The pet product of any of these embodiments, wherein the storage-leash connector is located on the leash adjacent a middle of a length of the storage unit, wherein the storage-leash connector is configured to have an attached configuration for securing the leash to the middle of the storage unit, and a released configuration detached from the storage unit; and
the storage-leash connector comprises mating portions of a hook-and-loop fastener that are configured to extend around the storage unit and secure to each other in the attached configuration.

8. The pet product of any of these embodiments, wherein the storage-leash connector extends from adjacent the middle of the leash to a distal end of the leash, the storage-leash connector includes mating portions, and a tube is located in the storage-leash connector.

9. The pet product of any of these embodiments, wherein the tube comprises a rigid polymer sleeve having a slit extending along a length thereof through which a retractable cord can be installed into the tube for extension and retraction therethrough, and the retractable cord can be removed from the tube via the slit.

10. The pet product of any of these embodiments, wherein each of the leash connectors comprise storage unit connectors, and the user mount connectors comprises a male or female buckle connector.

11. The pet product of any of these embodiments, wherein a proximal one of the leash connectors comprises a loop, and a distal one of the leash connectors comprises a storage-leash connector.

12. The pet product of any of these embodiments, wherein the proximal one of the leash connectors comprises a ring, buckle connector, or a strap having an adjustable length.

13. The pet product of any of these embodiments, wherein in the user configuration, an overall length of the storage unit and the user mount is configured to be adjustable in length to fit a waist of the user.

14. A pet product, comprising:
a leash comprising a strap, a handle on a proximal end of the leash configured to be grasped by a user, a clasp on a distal end of the leash configured to be releasably coupled to a pet restraint, leash connectors mounted to the leash between handle and the clasp, and the leash connectors extend toward each other;
a storage unit comprising storage unit connectors mounted on opposite ends thereof, the storage unit connectors extend in opposite directions from each other, the storage unit connectors are configured to be releasably coupled to respective ones of the leash connectors and the storage unit comprises a plurality of zippered pouches that are independently operable of each other, each zippered pouch has a collapsed configuration wherein the zippered pouch is retracted within the storage unit and zipped close, and a deployed configuration wherein the zippered pouch is unzipped open and expanded in volume for storage of another object;

a user mount comprising a strap having an adjustable length and user mount connectors configured to be releasably coupled to the leash connectors; and wherein the pet product comprises:

a fixed leash configuration wherein the leash is coupled to only the storage unit via the leash connectors and the storage unit connectors, respectively, the user mount connectors are not coupled to the leash connectors or the user mount connectors, such that the fixed leash configuration is configured for walking the pet with the leash;

a retractable configuration wherein the storage unit is configured to be attached only to a retractable leash having a body with a retractable cord extending therefrom, and the storage unit connectors are not coupled to the leash connectors or the user mount connectors, such that the retractable configuration is configured for walking the pet with the retractable leash; and a user configuration wherein the storage unit is coupled to only the user mount via the storage unit connectors and user mount connectors, and the storage unit connectors are not coupled to the leash connectors or the retractable leash, such that the user configuration is configured to be worn by the user and not directly coupled to the pet.

15. The pet product of any of these embodiments, wherein the storage unit comprises a storage-leash connector located on an opposite side relative to the zippered pouches and adjacent a middle of a length of the storage unit, wherein the storage-leash connector is configured to have an attached configuration for securing the middle of the length of the storage unit to the leash, and a released configuration detached from the leash.

16. The pet product of any of these embodiments, wherein the storage-leash connector comprises mating portions of a hook-and-loop fastener that extend around the leash and secure to each other in the attached configuration.

17. The pet product of any of these embodiments, wherein the storage-leash connector extends from adjacent the middle of the length of the storage unit to a distal end of the storage unit, the storage-leash connector includes mating portions, and a tube is located in the storage-leash connector; and the tube comprises a rigid polymer sleeve having a slit extending along a length thereof through which the retractable cord can be installed into the tube for extension and retraction therethrough, and the retractable cord can be removed from the tube via the slit.

18. The pet product of any of these embodiments, wherein each of the leash connectors comprise storage unit connectors, and the user mount connectors comprises a male or female buckle connector.

19. The pet product of any of these embodiments, wherein a proximal one of the leash connectors comprises a loop, and a distal one of the leash connectors comprises a storage-leash connector; and the proximal one of the leash connectors comprises a ring, buckle connector, or a strap having an adjustable length.

20. The pet product of any of these embodiments, wherein in the user configuration, an overall length of the storage unit and the user mount is configured to be adjustable in length to fit a waist of the user.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor,"

or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A pet product system, comprising:
    a leash comprising a strap, a handle on a proximal end of the leash configured to be grasped by a user, a clasp on a distal end of the leash configured to be releasably coupled to a pet restraint, the leash is contiguous and uninterrupted between the handle and the clasp; leash connectors mounted to the leash between handle and the clasp, and the leash connectors extend toward each other; and
    a storage unit comprising storage unit connectors mounted on opposite ends thereof, the storage unit connectors extend in opposite directions from each other, the storage unit connectors are configured to be releasably coupled to respective ones of the leash connectors and the storage unit comprises a plurality of zippered pouches that are independently operable of each other, each zippered pouch has a collapsed configuration wherein the zippered pouch is retracted within the storage unit and zipped close, and a deployed configuration wherein the zippered pouch is unzipped open and expanded in volume to an exterior of the storage unit for storage of another object.

2. The pet product system of claim 1, further comprising a user mount comprising a strap having an adjustable length and user mount connectors.

3. The pet product system of claim 2, further comprising a fixed leash configuration wherein the leash is coupled to only the storage unit via the leash connectors and the storage unit connectors, respectively, the user mount connectors are not coupled to the leash connectors or the user mount connectors, such that the fixed leash configuration is configured for walking the pet with the leash.

4. The pet product system of claim 2, further comprising a user configuration wherein the storage unit is coupled to only the user mount via the storage unit connectors and user mount connectors, and the storage unit connectors are not coupled to the leash connectors, such that the user configuration is configured to be worn by the user and not directly coupled to the pet.

5. The pet product system of claim 1, wherein one of the leash and storage unit comprises a storage-leash connector configured to be releasably coupled to the other of the leash and storage unit.

6. The pet product system of claim 5, wherein the storage-leash connector is located on the leash adjacent a middle of a length of the storage unit, wherein the storage-leash connector is configured to have an attached configuration for securing the leash to the middle of the storage unit, and a released configuration detached from the storage unit; and
    the storage-leash connector comprises mating portions of a hook-and-loop fastener that are configured to extend around the storage unit and secure to each other in the attached configuration.

7. The pet product system of claim 1, wherein each of the leash connectors comprise storage unit connectors.

8. The pet product system of claim 1, wherein a proximal one of the leash connectors comprises a loop, and a distal one of the leash connectors comprises a storage-leash connector.

9. The pet product system of claim 8, wherein the proximal one of the leash connectors comprises a ring, buckle connector, or a strap having an adjustable length.

10. The pet product system of claim 1, wherein in a user configuration, an overall length of the storage unit and a user mount is configured to be adjustable in length to fit a waist of the user.

11. A pet product system, comprising:
    a leash comprising a strap, a handle on a proximal end of the leash configured to be grasped by a user, a clasp on a distal end of the leash configured to be releasably coupled to a pet restraint, leash connectors mounted to the leash between handle and the clasp, and the leash connectors extend toward each other;
    a storage unit comprising storage unit connectors mounted on opposite ends thereof, the storage unit connectors extend in opposite directions from each other, the storage unit connectors are configured to be releasably coupled to respective ones of the leash connectors and the storage unit comprises a plurality of zippered pouches that are independently operable of each other, each zippered pouch has a collapsed configuration wherein the zippered pouch is retracted within the storage unit and zipped close, and a deployed configuration wherein the zippered pouch is unzipped open and expanded in volume for storage of another object;
    a user mount comprising a strap having an adjustable length and user mount connectors; and wherein the pet product comprises:
    a fixed leash configuration wherein the leash is coupled to only the storage unit via the leash connectors and the storage unit connectors, respectively, the user mount connectors are not coupled to the leash connectors or the user mount connectors, such that the fixed leash configuration is configured for walking the pet with the leash; and
    a user configuration wherein the storage unit is coupled to only the user mount via the storage unit connectors and user mount connectors, and the storage unit connectors are not coupled to the leash connectors, such that the user configuration is configured to be worn by the user and not directly coupled to the pet.

12. The pet product system of claim 11, wherein the storage unit comprises a storage-leash connector located on an opposite side relative to the zippered pouches and adjacent a middle of a length of the storage unit, wherein the storage-leash connector is configured to have an attached configuration for securing the middle of the length of the storage unit to the leash, and a released configuration detached from the leash.

13. The pet product system of claim 12, wherein the storage-leash connector comprises mating portions of a hook-and-loop fastener that extend around the leash and secure to each other in the attached configuration.

14. The pet product system of claim 11, wherein each of the leash connectors comprise storage unit connectors, and the user mount connectors comprises a male or female buckle connector.

15. The pet product system of claim 11, wherein a proximal one of the leash connectors comprises a loop, and a distal one of the leash connectors comprises a storage-leash connector; and the proximal one of the leash connectors comprises a ring, buckle connector, or a strap having an adjustable length.

16. The pet product system of claim 11, wherein in the user configuration, an overall length of the storage unit and the user mount is configured to be adjustable in length to fit a waist of the user.

* * * * *